United States Patent
Sigmund et al.

(10) Patent No.: US 10,253,190 B2
(45) Date of Patent: Apr. 9, 2019

(54) TRANSPARENT DURABLE SUPERHYDROPHOBIC CERAMIC COATING

(71) Applicant: University of Florida Research Foundation, Inc., Gainesville, FL (US)

(72) Inventors: Wolfgang M. Sigmund, Gainesville, FL (US); Yung-Chieh Hung, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 78 days.

(21) Appl. No.: 15/224,840

(22) Filed: Aug. 1, 2016

(65) Prior Publication Data
US 2017/0058131 A1    Mar. 2, 2017

Related U.S. Application Data

(60) Provisional application No. 62/209,440, filed on Aug. 25, 2015.

(51) Int. Cl.
| | | |
|---|---|---|
| *C09D 183/04* | (2006.01) | |
| *C09D 5/16* | (2006.01) | |
| *C09D 183/08* | (2006.01) | |
| *B05D 5/08* | (2006.01) | |
| *B05D 1/18* | (2006.01) | |
| *C23C 18/00* | (2006.01) | |
| *C03C 17/00* | (2006.01) | |
| *C09D 7/40* | (2018.01) | |
| *C09D 7/80* | (2018.01) | |
| *C08G 77/24* | (2006.01) | |
| *B82Y 30/00* | (2011.01) | |
| *C09D 1/02* | (2006.01) | |

(52) U.S. Cl.
CPC ........... *C09D 5/1681* (2013.01); *B05D 1/185* (2013.01); *B05D 5/083* (2013.01); *C03C 17/009* (2013.01); *C09D 7/67* (2018.01); *C09D 7/70* (2018.01); *C09D 7/80* (2018.01); *C09D 183/04* (2013.01); *C09D 183/08* (2013.01); *C23C 18/00* (2013.01); *B82Y 30/00* (2013.01); *C03C 2217/213* (2013.01); *C03C 2217/445* (2013.01); *C03C 2217/478* (2013.01); *C03C 2217/76* (2013.01); *C08G 77/24* (2013.01); *C09D 1/02* (2013.01)

(58) Field of Classification Search
CPC .. C09D 183/04; C09D 183/08; C09D 5/1681; B05D 5/038; B05D 5/02; B05D 1/185
See application file for complete search history.

(56) References Cited

U.S. PATENT DOCUMENTS 8,663,742 B2    3/2014  Kissel et al.

FOREIGN PATENT DOCUMENTS

| JP | 2012-167809 | * | 9/2012 |
| JP | 2013-111500 | * | 6/2013 |

OTHER PUBLICATIONS

English language translation JP 2013-111500, Jun. 2013 (Year: 2013).*
English language abstract JP 2013-111500, Jun. 2013 (Year: 2013).*
English language abstract JP 2012-167809, Sep. 2012 (Year: 2012).*
Goswami, D. et al., "Superhydrophobic Films on Glass Surface Derived from Trimethylsilanized Silica Gel Nanoparticles," ACS Applied Materials & Interfaces, 2011, pp. 3440-3447, vol. 3.
Manca, M. et al., "Durable Superhydrophobic and Antireflective Surfaces by Trimethylsilanized Silica Nanoparticles-Based-Sol-Gel Processing," Langmuir, 2009, pp. 6357-6362, vol. 25, No. 11.
Zhang, X. et al., "Sol-Gel Preparation of PDMS/Silica Hybrid Antireflective Coatings with Controlled Thicknes and Durable Antireflective Performance," J. Phys. Chem. C, 2010, pp. 19979-19983, vol. 114.

* cited by examiner

*Primary Examiner* — Margaret G Moore
(74) *Attorney, Agent, or Firm* — Timothy H. Van Dyke; Beusse, Wolter, Sanks & Maire PLLC

(57) ABSTRACT

A superhydrophobic ceramic coating that is transparent and durable includes a dispersion of a multiplicity of silica nanoparticles stacked to form a topography that is rough that is infused with and conformally coated with a sol-gel glass matrix that has a fluoroalkyl silane or an alkyl silane monolayer on the surface of the coating. The silica nanoparticles do not scatter light to a large extent as they are sufficiently small and free of aggregation. The sol-gel glass is formed from a trialkoxysilane precursor and applied to the stacked silica nanoparticles to retain the rough topography of the deposited nanoparticles.

12 Claims, 2 Drawing Sheets

TRANSPARENT DURABLE SUPERHYDROPHOBIC CERAMIC COATING

CROSS-REFERENCE TO A RELATED APPLICATION

This application claims the benefit of U.S. Provisional Application Ser. No. 62/209,440 filed Aug. 25, 2015, the disclosure of which is hereby incorporated by reference in its entirety, including all figures, tables and drawings.

BACKGROUND OF INVENTION

Superhydrophobic surfaces are those that display a water contact angle larger than about 150°. Superhydrophobicity and self-cleaning are properties of a Lotus Effect surface. A Lotus Effect surface arises when the surface is covered with a low surface free energy material, which provides a relatively high contact angle with water, and has a very fine rough structure.

Surfaces with a fine rough structure allow air to be trapped in the fine structures to reduce the contact area between the liquid and the surface. For example, when a water drop is placed on a lotus plant surface, air is entrapped in the nano-rough surface structures and only the tip of the nano-structures contact the water drop. The water contact area is only 2-3% of a droplet-covered surface of a lotus plant leaf. Therefore, the water gains very little energy through adsorption to compensate for any enlargement of its surface and the water forms a spherical droplet with the contact angle of the droplet depending almost entirely on the surface tension of the water.

The relationship between the surface water contact angle and the surface structural geometry, the Wenzel roughness, is given by the Cassie equation:

$$\cos \theta_A = rf_1 \cos \theta_Y + f_1 - 1 \qquad \text{Equation 1}$$

where the r is the ratio of the actual solid-liquid contact area to its vertical projected area (Wenzel roughness factor), $\theta_A$ is the apparent contact angle on the rough surface, and $\theta_Y$ is the contact angle on a flat surface as per Young's equation, $f_1$ is the solid surface fraction. This roughness to form a Lotus Effect surface can be produced by etching a nanoscale rough structure on a hydrophobic surface; coating a thin hydrophobic film on nanoscale rough surface; or simultaneously creating a rough structure with a decreased material surface energy.

Superhydrophobic properties are desirable for many applications. A durable superhydrophobic and self-cleaning coating would be invaluable for use in: high voltage industry to limit leakage currents and to prevent flashover; microelectromechanical systems (MEMS) industry to limit or prevent stiction; and anticorrosion of metal coatings. Other applications for superhydrophobic surfaces include: directed liquid flow in microfluidics; antifouling in biomedical applications; and transparent coatings in photovoltaics devices.

Superhydrophobic surface coatings of architectural glass, smart phones, touch screens, and many other articles that need to stay smudge free and clean and water free would benefit if the coating is transparent and durable. Such coatings could be used to reduce or avoid fogging, for example on bathroom mirrors, shower doors and the interior of a car windshield. The coating would display a degree of ice-phobicity, which would keep turbine blades of windmills running in cold climates, and reduce ice build-up on ships, planes, cars, trucks, and architectural structures.

To this end, the development of transparent superhydrophobic coatings that are durable and can be applied at or near ambient temperatures and pressures is desirable.

BRIEF SUMMARY

In an embodiment of the invention, a transparent and durable superhydrophobic ceramic coating is a dispersion of a multiplicity of silica nanoparticles that are stacked from a substrate surface to form a topography that is rough. The stacked silica nanoparticles are infused with and conformally coated with a sol-gel glass matrix and the surface has a fluoroalkyl silane or an alkyl silane monolayer bonded to the surface of the coating. The domain sizes of the silica nanoparticles are sufficiently small such that most light transmits through the coating. The sol-gel glass is formed from a trialkoxysilane precursor and applied to the stacked silica nanoparticles to retain the rough topography of the deposited nanoparticles.

In another embodiment of the invention, the transparent durable superhydrophobic ceramic coating is formed by depositing a multiplicity of silica nanoparticles on a substrate with a rough topography and infusing the silica nanoparticle ensemble with a sol of tetraalkoxysilanes that is a precursor of a sol-gel $SiO_2$ glass, which forms a sol-gel glass matrix that conforms to the rough topography of the stacked nanoparticles. The sol-gel glass is then surface modified by bonding a fluoroalkylsilane on the surface by a self-assembly monolayer deposition of reactive silane such as a perfluoralkytrichlorosilane.

DETAILED DISCLOSURE

Figure 1:
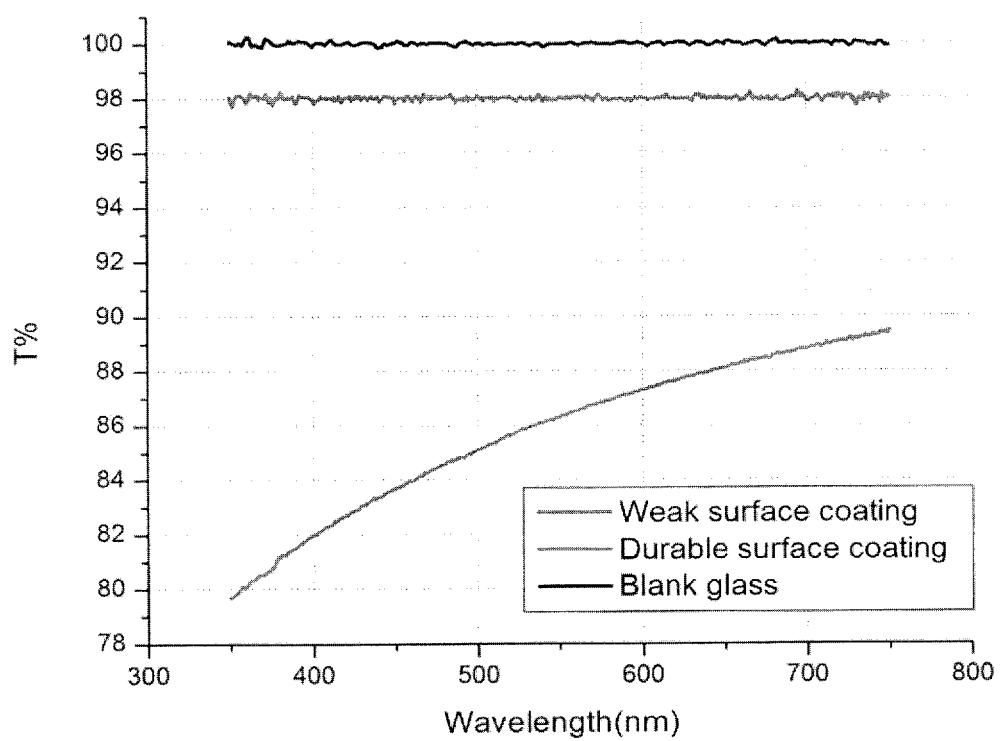
FIG. 1 shows a composite plot of % transmittance over the visible spectrum for the durable ceramic coating on a glass slide according to an embodiment of the invention in comparison to a poorly durable coating of similar composition on a glass slide and a reference untreated glass slide.

In embodiments of the invention, nanometer size silica particles are deposited such that they stack randomly on the surface forming a surface with a rough structure. The nanoparticles are subsequently bound together with a silica sol-gel matrix that is applied as coating that retains the rough surface structure. After curing the coating by heating, the surface of the rough durable ceramic coating is conformally over-coated with a fluorocarbon comprising compound, which is also referred to as a fluorinating agent herein, and forms a self-assembly monolayer bound to the sol-gel glass surface at the air interface. The careful control of particle size, stacking structure, coating, and over-coating allows formation of a ceramic coating that is transparent and durable. Advantageously, when the film of the fluorocarbon comprising compound is thin, the ceramic coating is superhydrophobic, durable, and transparent. A well-controlled spray coating allows for the preparation of glass articles that are superhydrophobic and transparent. The fluorinating agent is one that undergoes reaction with surface hydroxyl groups to form bonds that secure a perfluoroalkyl chain to the surface. The reaction can be catalyzed or uncatalyzed.

In an embodiment of the invention, silica nanoparticles of 30 to 60 nm are dispersed as a suspension in water or an organic solvent. A large variety of organic solvents or mixtures of solvents can be used, including, but not limited to, ethanol, acetone, and chloroform. The silica nanoparticle suspension is then used for deposition on a substrate. In embodiments of the invention, the deposition can be by any means that permit a resulting rough surface, where the surface is rough with nanometer dimensions of peak and valley features formed by the silica nanoparticles. Typically the majority of dimensions is less than 400 nm in size. The solid loadings of the nanoparticle suspensions are 0.1% to 1.0% by weight, with excellent results achieved for 0.2 to 0.6% by weight solids. These suspensions can be used for dip-coating or spray-coating. The dispersed silica nanoparticulate coating can be dried and the surface recoated with the suspension. The quality of the superhydrophobicity and the transparency depends upon the coating thickness. When dip-coating is employed, typically two or more depositions are required for excellent superhydrophobicity; however, the transparency of the ultimate ceramic coating can be compromised when more than five depositions are carried out with higher solid loadings of the suspension.

The sol-gel silica coating is deposited in a manner that permits the resulting sol-gel glass to conform to the deposited rough silica nanoparticle surface such that it binds the entire ensemble of nanoparticles yet retains the peaks and valleys required to allow superhydrophobicity of the final ceramic coating. The sol-gel glass can be from hydrolysis and condensation of a tetraalkoxysilane, such as, but not limited to, tetraethoxysilane (TEOS) or tetramethoxysilane (TMOS). Typically a solution of the silane in a mixed water-alcohol solvent is contacted with the article having had a silica nanoparticle surface deposited thereon. The contacting can be by dip-coating or spray-coating. For example, when the sol-gel glass precursor solution is applied by dip-coating, the concentration of the silanes and water and the contact time, which is proportional to the rate in which the article is drawn through the solution, effect the superhydrophobicity and durability of the ultimate ceramic coating. If the contact is too long or the silane concentration is too high, the features of the rough surface can be compromised such that super hydrophobicity is not achieved, but the durability is excellent. If the contact is too short or the silane concentration is too low, the features of the rough surface can be retained to provide super hydrophobicity, but the durability can be disappointing. The silane solutions can be deposited on the silica surface from solutions with silane concentrations of 1 to 5%. Using lower concentrations can permit multiple deposition of the silane solution until a good durability and superhydrophobicity is achieved. The organic solvent for the silane solution can be an alcohol, for example, ethanol with TEOS and a catalyst, for example HCl, and can be in the solution to promote hydrolysis and condensation of the silanes to glass.

The over-coating of a fluorinating agent can be a fluorinated organosilane-coupling agent. The deposition of a self-assembled monolayer is desirable to give the optimal surface properties while maintaining the rough surface. Suitable agents have the structure: $R_nSiX_{(4-n)}$, where n is 1-3, X is independently a hydroxyl group or a hydrolysable group, and R is independently a non-hydrolysable group, wherein at least one R group is a fluorinated hydrocarbon group. The hydrolyzable group, X can be H, Cl, Br, I, $C_1$-$C_6$ alkoxy, $C_6$-$C_{10}$ aryloxy, $C_1$-$C_6$ acyloxy, amino, $C_1$-$C_3$ alkylamino, $C_2$-$C_6$ dialkylamino, or any combination thereof. R is $C_1$-$C_6$ alkyl, phenyl, $C_2$-$C_5$ alkenyl, or $C_3$-$C_{20}$ organo group comprising a partially fluorinated or perfluorinated alkyl, cycloalkyl, aryl, or alkylaryl group that can be optionally interrupted one or more times with an oxygen atom. The fluorinated alkyl group can be linear, branched, hyperbranched or dendritic. The fluorinated alkyl group can be of the formula, $C_xF_{2x+1}CH_2CH_2$—, such as, but not limited to, $CF_3CH_2CH_2$—, $C_2F_5CH_2CH_2$—, n-$C_6F_{13}CH_2CH_2$—, i-$C_3F_7OCH_2CH_2CH_2$—, n-$C_8F_{17}CH_2CH_2$—, and n-$C_{10}F_{21}CH_2CH_2$— where x is 1 to 30. In addition to fluorinated organosilane-coupling agents, alkylsilane coupling agents can be used that retain much of the superhydrophobic character, although typically contact angles of water droplets are diminished from the excellent values displayed by the fluorinating agents.

The durable superhydrophobic ceramic coatings formed according to embodiments of the invention achieve in excess of 80% transmittance of visible light when deposited on a transparent article. The durable transparent superhydrophobic ceramic coatings formed according to embodiments of the invention can retain their superhydrophobicity even under a nominal abrasion, to which one would anticipate subjecting the transparent article. The durable transparent superhydrophobic ceramic coatings can be employed on windows, windshields, and displays, such as LED or OLED for TV's, computer monitors, or cell phones.

Methods and Materials

Nanoparticles Synthesis

The Stöber process was used to synthesize silica nanoparticles having diameters of 30 nm, 40 nm, 50 nm, and 60 nm. The Stöber process recipe used for preparation of exemplary ceramic coating employed a solution formed from the combination of: TEOS: 8.33 g (0.4M), deionized (DI) water: 5 g (2.5 ml/L$^{-1}$), $NH_4OH$: 0.98 g (0.28M), and Ethanol: 100 ml (99% pure). Silica nanoparticles of different sizes were prepared by maintaining solution temperatures at 40, 50 or 60° C. for 24 hours with stirring. Nanoparticles were isolated by evaporating the solvent and reaction by-products.

Nanoparticles Deposition

Dispersions of the silica nanoparticles were made using ethanol. Excellent final coating results were achieved when dispersions with solid loadings (SLs) of 0.2% (0.1 g/50 ml), 0.4% (0.2 g/50 ml), and 0.6% (0.3 g/50 ml) were used. Dispersion was achieved by mixing the silica nanoparticles and ethanol with ultrasonic mixing. The dip-coating of glass slides was performed with a repetition of the dip-coating of 2 to 5 times for different slides with different SLs. Final coating effects that depended on the nanoparticle deposition are tabulated below for spherical nanoparticles of 50 nm diameter.

TABLE 1

Hydrophobic and superhydrophobic behavior of the final ceramic coatings based on the SLs and number of coating cycles employed for the 50 nm silica nanoparticle deposition

| Solid Loading | 2 cycles | 3 cycles | 4 cycles | 5 cycles |
| --- | --- | --- | --- | --- |
| 0.1 g/50 ml | Hydrophobic | Hydrophobic | Hydrophobic | Superhydrophobic |
| 0.2 g/50 ml | Hydrophobic | Superhydrophobic | | |
| 0.3 g/50 ml | Superhydrophobic | | | |

Fabrication of Sol-Gel Bound Silica Nanoparticle Coating

A sol-gel formulation for deposition of a sol-gel glass around the deposited silica nanoparticles was prepared from: deionized (DI) water: 28.8 g; ethanol: 18.4 g (99% pure); TEOS: 20.8 g; and 1M hydro chloride solution: 2 ml to give a formulation with a molar ratio of TEOS:water:ethanol of 1:16:4. After dilution with ethanol to achieve concentrations of TEOS in ethanol of 1, 2, 3, 4, and 5% by weight, deposition was carried out by dipping the various samples of silica nanoparticles on a glass slide where the dipped slides were pulled through the solution at a rate of 15 cm/second. Results for final coatings based on the mode of sol gel glass deposition are tabulated in Table 2, below. An excellent balance of superhydrophobicity and durability was observed for ceramic coatings formed with 3 and 4% by weight loadings of TEOS.

TABLE 2

Wettability and durability behavior listed with the concentration difference of sol-gel TEOS concentration

| Wt % TEOS | 1 | 2 | 3 | 4 | 5 |
|---|---|---|---|---|---|
| Hydrophobicity | Super | Super | Super | Super | |
| Durability | Not | Poor | Durable | Durable | Very |

Self-Assembled Monolayer Over-Coating Deposition

Heptadecafluorodecyltrichlorosilane, as a 0.2% to 0.5% solution in chloroform, was contacted with the ceramic coating resulting after sol-gel glass deposition to yield the bound fluorocarbon monolayer on the silica.

Characterization:

Transmittance

Transmittance through the coated glass slides was measured using an UV/Visible Perkin Elmer Lambda800. FIG. 1 shows the transmittance (T %) of durable and poorly durable coated glass slides and a reference glass slide. The poorly durable coatings have more than 98% of the transmittance of the uncoated glass slide throughout the visible spectrum (400-700 nm). Durable ceramic coated slides retained 82%~90% of the transmittance of the uncoated slides. The small loss in transmittance was virtually indistinguishable to the naked eye.

Durability

Figure 2:
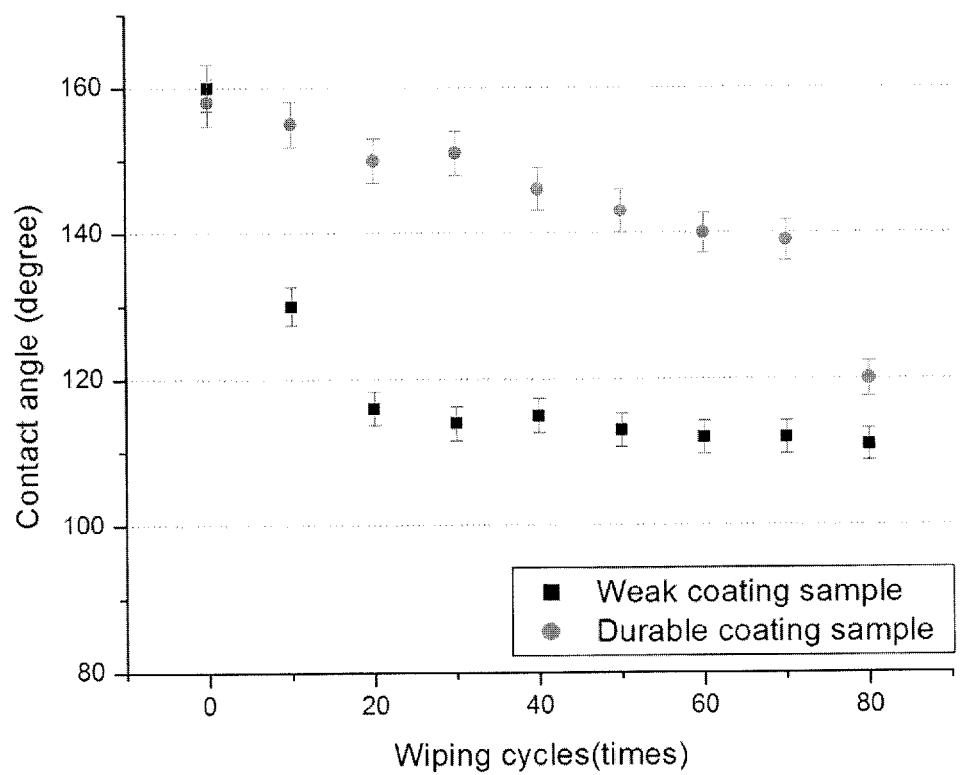
FIG. 2 shows a plot of the contact angle for a weak ceramic coating and a durable ceramic coating, according to an embodiment of the invention, after repeated abrasive wiping cycles.

Durability testing was carried out using a linear abraser model 5700 manufactured by TABER industry. The abrasive employed was a windshield wiper manufactured by BOSCH that was swept across the ceramic coating with a force of 1.5 ounce/inch. FIG. 2 illustrates the ability of the durable coating to retain a contact angle (CA) in excess of 140 degrees through about 70 wiping cycles, whereas the poor durability coating, though equivalent to the durable coating in contact angle when prepared, loses its superhydrophobicity rapidly with a contact angle drop to 110 degrees after only 10 wiping cycles which is approximately the 115 degrees that is achieved by surface treatment of the glass slide with heptadecafluorodecyltrichlorosilane.

It should be understood that the examples and embodiments described herein are for illustrative purposes only and that various modifications or changes in light thereof will be suggested to persons skilled in the art and are to be included within the spirit and purview of this application.

We claim:

1. A durable and transparent superhydrophobic ceramic coating comprising:
   a stacked structure, the stacked structure comprising a random dispersion of silica nanoparticles, the stacked structure being formed by 2 to 5 depositions of a solution comprising from 0.1 to 1.0% by weight of silica nanoparticles, the stacked structure having a topography comprising peaks and valleys, wherein a majority of dimensions of the peaks and valleys are less than 400 nm;
   a sol-gel glass matrix, the sol-gel glass matrix coating the stacked structure with a degree of conformity sufficient to retain the topography of the stacked structure, the sol-gel glass matrix binding the random dispersion of silica nanoparticles, the sol-gel glass matrix being formed by hydrolysis and condensation a sol-gel formulation comprising 3 to 4% by weight of a tetraalkoxysilane; and
   a monolayer bound to the sol-gel glass matrix, the monolayer comprising at least one monolayer precursor selected from a fluoroalkyl silane, an alkyl silane, and combinations thereof,
   wherein the durable and transparent superhydrophobic coating has a transmittance of at least 80%, and
   wherein the durable and transparent superhydrophobic coating retains a contact angle greater than 140° after a 70 cycle linear abrasion test performed with a windshield wiper at a force of 1.5 ounce/inch.

2. The durable and transparent superhydrophobic ceramic coating according to claim 1, wherein the tetraalkoxysilane is tetraethoxysilane.

3. The durable and transparent superhydrophobic ceramic coating according to claim 1, wherein the tetraalkoxysilane is tetramethoxysilane.

4. The durable and transparent superhydrophobic ceramic coating according to claim 1, wherein said silica nanoparticles are 20 to 100 nm in cross-section.

5. The durable and transparent superhydrophobic ceramic coating according to claim 1, wherein said silica nanoparticles are spherical in shape.

6. The durable and transparent superhydrophobic ceramic coating according to claim 1, wherein said fluoroalkyl silane has the structure $F_3C(CF_2)_xCH_2CH_2Si$ where x is 2 to 20.

7. A method of preparing a durable and transparent superhydrophobic ceramic coating comprising:
   a stacked structure, the stacked structure comprising a random dispersion of silica nanoparticles, the stacked structure being formed by 2 to 5 depositions of a solution comprising from 0.1 to 1.0% by weight of silica nanoparticles, the stacked structure having a topography comprising peaks and valleys, wherein a majority of dimensions of the peaks and valleys are less than 400 nm;
   a sol-gel glass matrix, the sol-gel glass matrix coating the stacked structure with a degree of conformity sufficient to retain the topography of the stacked structure, the sol-gel glass matrix binding the random dispersion of silica nanoparticles, the sol-gel glass matrix being formed by hydrolysis and condensation a sol-gel formulation comprising 3 to 4% by weight of a tetraalkoxysilane; and
   a monolayer bound to the sol-gel glass matrix, the monolayer comprising at least one monolayer precursor selected from a fluoroalkyl silane, an alkyl silane, and combinations thereof,
   wherein the durable and transparent superhydrophobic coating has a transmittance of at least 80%, and
   wherein the durable and transparent superhydrophobic coating retains a contact angle greater than 140° after a 70 cycle linear abrasion test performed with a windshield wiper at a force of 1.5 ounce/inch, the method comprising,
provide a substrate;
performing 2 to 5 depositions of the solution comprising from 0.1 to 1.0% by weight of silica nanoparticles onto the substrate to form the stacked structure;
infusing the stacked structure with the sol-gel formulation comprising 3 to 4% by weight of the tetraalkoxysilane;
performing the hydrolysis and condensation of the sol-gel formulation to form the sol-gel glass matrix; and
contacting the sol-gel glass matrix with the at least one monolayer precursor to form the monolayer bound to the sol-gel glass matrix.

8. The method of claim 7, wherein said silicon nanoparticles are 20 to 100 nm in cross-section.

9. The method of claim 7, wherein said silica nanoparticles are spherical in shape.

10. The method of claim 7, wherein said tetraalkoxysilane is tetramethoxysilane.

11. The method of claim 7, wherein said tetraalkoxysilane is tetraethoxysilane.

12. The method of claim 7, wherein said fluoroalkyl silane coupling agent is $F_3C(CF_2)_xCH_2CH_2SiCl_3$ where x is 2 to 20.

* * * * *